US008243356B2

(12) United States Patent
Robertsson et al.

(10) Patent No.: US 8,243,356 B2
(45) Date of Patent: Aug. 14, 2012

(54) SECURITY DOCUMENT CIRCUIT

(75) Inventors: Mats Robertsson, Norrköping (SE); Petronella Norberg, Linköping (SE); Xin Wang, Norrköping (SE); Staffan Nordlinder, Norrköping (SE); Anna Malmström, Norrköping (SE); Lars-Olov Hennerdal, Örebro (SE); James Peter Snelling, Andover (GB); Philip George Cooper, Stockbridge (GB)

(73) Assignee: De la Rue International Limited, Hampshire (GB)

( * ) Notice: Subject to any disclaimer, the term of this patent is extended or adjusted under 35 U.S.C. 154(b) by 272 days.

(21) Appl. No.: 12/451,210

(22) PCT Filed: Apr. 30, 2008

(86) PCT No.: PCT/EP2008/055353

§ 371 (c)(1),
(2), (4) Date: Dec. 16, 2009

(87) PCT Pub. No.: WO2008/135502

PCT Pub. Date: Nov. 13, 2008

(65) Prior Publication Data

US 2010/0118378 A1 May 13, 2010

Related U.S. Application Data

(60) Provisional application No. 60/924,239, filed on May 4, 2007.

(30) Foreign Application Priority Data

May 4, 2007 (EP) .................................... 07107582

(51) Int. Cl.
*G02F 1/153* (2006.01)

(52) U.S. Cl. ....................................................... 359/267

(58) Field of Classification Search .......... 359/265–275; 235/382.5, 492, 493, 488; 340/5.2, 5.21, 340/5.8, 5.86
See application file for complete search history.

(56) References Cited

U.S. PATENT DOCUMENTS

| | | | |
|---|---|---|---|
| 6,587,250 | B2 | 7/2003 | Armgarth et al. |
| 6,642,069 | B2 | 11/2003 | Armgarth et al. |
| 6,918,535 | B1 | 7/2005 | Brusow |
| 7,032,828 | B2 | 4/2006 | Krul et al. |

(Continued)

FOREIGN PATENT DOCUMENTS

| | | |
|---|---|---|
| CA | 2 580 332 | 3/2006 |

(Continued)

OTHER PUBLICATIONS

Office Action dated Feb. 3, 2011 issued in corresponding Australian Application No. 2008248628.

*Primary Examiner* — Ricky Mack
*Assistant Examiner* — Tuyen Tra
(74) *Attorney, Agent, or Firm* — Harness, Dickey & Pierce, PLC

(57) ABSTRACT

The authenticity of a security document, such as a bank note, is verified by use of a security feature arranged in or on the document, which security feature comprises an antenna arranged to receive EM-radiation from an external energy source; a rectifier arranged to receive electric energy from the antenna and convert it into a rectified current; and an electrochromic display arranged to alter its electrochromic state in response to said rectified current. Hence, a security feature able alter its appearance in response to EM-radiation is provided, which comprises a display that can be given a large variety of two dimensional shapes.

24 Claims, 6 Drawing Sheets

U.S. PATENT DOCUMENTS

| | | | |
|---|---|---|---|
| 7,090,917 B2 | 8/2006 | Puttkammer | |
| 7,158,277 B2 | 1/2007 | Berggren et al. | |
| 2002/0134980 A1 | 9/2002 | Armgarth et al. | |
| 2003/0164611 A1 | 9/2003 | Schneider et al. | |
| 2004/0155650 A1 | 8/2004 | Plaas-Link et al. | |
| 2004/0256644 A1 | 12/2004 | Kugler et al. | |
| 2005/0150740 A1 | 7/2005 | Finkenzeller et al. | |
| 2005/0161501 A1 | 7/2005 | Giering et al. | |
| 2008/0035736 A1* | 2/2008 | Tompkin et al. | 235/488 |
| 2008/0198278 A1 | 8/2008 | Ludwig et al. | |

FOREIGN PATENT DOCUMENTS

| | | |
|---|---|---|
| CA | 2 587 784 | 6/2006 |
| CA | 2 590 622 | 6/2006 |
| CA | 2 614 064 | 1/2007 |
| DE | 103 32 524 | 2/2005 |
| DE | 10 2004 059 465 | 6/2006 |
| DE | 10 2005 031 448 | 1/2007 |
| EP | 0 059 056 | 9/1982 |
| WO | WO 93/08327 | 4/1993 |
| WO | WO 00/39391 | 7/2000 |
| WO | WO 03/057502 | 7/2003 |
| WO | WO 04/001877 | 12/2003 |
| WO | WO 2004/086315 | 10/2004 |
| WO | WO 2006/008700 | 1/2006 |
| WO | WO 2006/029857 | 3/2006 |
| WO | WO 2006/061171 | 6/2006 |

* cited by examiner

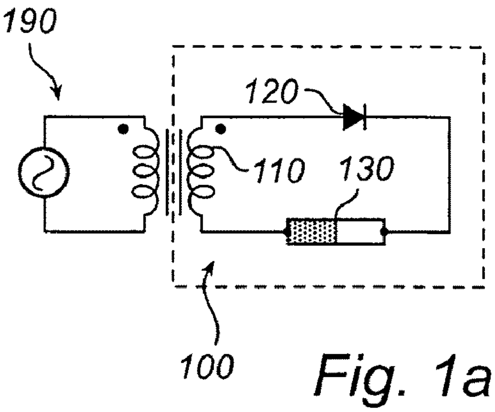
Fig. 1a
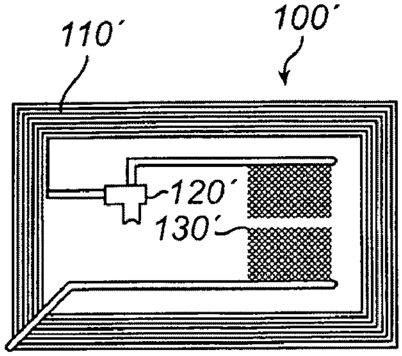
Fig. 1a´
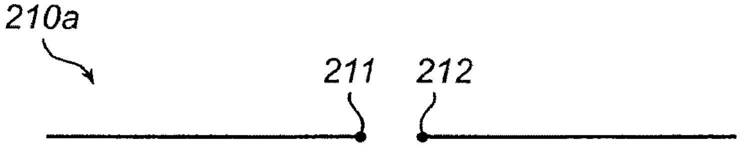
Fig. 2a
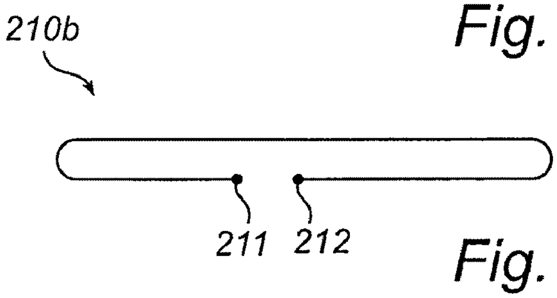
Fig. 2b
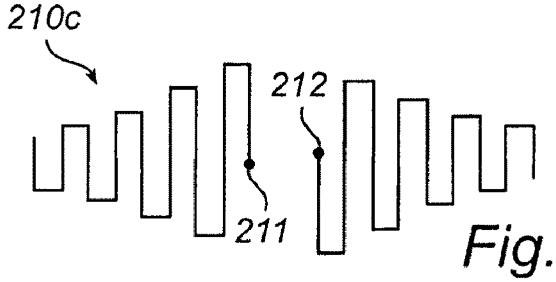
Fig. 2c
Fig. 2d
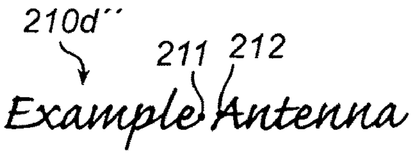
Fig. 2d´

SECURITY DOCUMENT CIRCUIT

CROSS-REFERENCE TO RELATED APPLICATIONS

This application is a National Phase entry of PCT Application PCT/EP2008/055353, filed on Apr. 30, 2008, and claims priority under 35 U.S.C. §119 to EP Application No. 07107582.4, filed May 4, 2007 and U.S. Provisional Application No. 60/924,239, filed on May 4, 2007, the entire contents of all of which are hereby incorporated by reference in their entirety.

TECHNICAL FIELD

The invention relates to a security device and in particular a public recognition security device which is used to give defence against copying and counterfeiting of articles such as security documents including banknotes, travellers cheques, bonds share certificates, ID cards, passports, security passes, tickets, fiscal stamp, certificates of authenticity and security labels.

BACKGROUND

There is a constant interest in protecting security or value documents against counterfeiting and unauthorized reproduction. This is preferably done by using a public recognition security feature, i.e. a security feature which can be easily determined without additional aids. A well known class of public security features are watermarks. These are normally easily recognizable in transmitted light, and display a predetermined motif or value.

Another example of a public security feature/device is security threads. Said threads are normally made of a plastic material and inserted into the paper during paper making. These threads are normally quite narrow and are visible as a dark line when the security document is viewed in transmitted light. Further, metallized security tapes or threads are known, which often are provided with a hologram that shows different visual impressions, such as colour effects or information, from different viewing angles. Normally, at least a portion of the security thread is arranged on the surface of the security document, such that it is easily visible.

Many of the above listed security features were previously an obstacle to counterfeiters, but are today more easily copied. Hence, there is a need for an alternative public security feature which is difficult to copy by known counterfeiting techniques.

SUMMARY OF THE INVENTION

The invention is built on an insight of a new, advantageous use of Electrochromic Displays (EC-displays), which use provides numerous advantages as described below. The invention relates for example to use of an electromagnetic field-affectable electrochromic element as a security feature.

Electrochromic materials exhibit colour changes or changes in optical density as a result of electrochemical reduction and/or oxidation reactions. An electrochromic material can either be present as a solid, or exist as molecular, neutral or ionic species in an electrolyte solution. These materials have been used for the creation of electrochromic cells, where the passage of electric charge causes colour changes in the materials. Electrochromic displays or electrochromic cells are used in electrochromic devices of different kinds, and two principal categories of these devices can be distinguished. The two categories differ from each other mainly in the arrangement of the elements of the electrochromic cell.

The first category of electrochromic devices utilizes a sandwich construction, and is used in applications such as automobile windows, building windows, sunglasses, large billboards, mirrors with variable reflectance, sunroofs etc. In this type of electrochromic device, continuous layers of electrochromic material and electrolyte (as well as other layers of e.g. ion reservoir material) are confined between two electrodes that completely cover the layers of electrochromic material and electrolyte. For the, electrochromic device to be of use, at least one of said electrodes has to be transparent to let light through the device. This requirement is met through the use of electrode materials such as indium-doped tin oxide (ITO), tin dioxide or fluorine-doped tin dioxide. The electrochromic materials used in these applications vary, but are often based on heavy metal oxides such as $WO_3$ or conducting polymers such as polyaniline or polypyrrole. The conducting, electrochromic polymer poly-(3,4-ethylendioxythiophene) (PEDOT) has attracted much study, and sandwich devices incorporating this polymer have been realized.

The second category of electrochromic devices are aimed at providing an electrically updateable display for realization on a flexible support. U.S. Pat. No. 6,587,250, describes such a display, comprising an electron conducting material, an electrochromic material, two electrodes and a solidified electrolyte. This display allows the electrochromic material to be addressed via the electrolyte, so that the electrode architecture is not limited by the requirement that the electrodes of the voltage supply should be in direct electrical contact with the electrochromic material for electrochromic effects to occur. More detailed examples of how to design and manufacture this type of electrochromic displays as well as suitable materials can be found in U.S. Pat. Nos. 6,587,250, 6,642,069 and U.S. patent application Ser. No. 10/505,573, which are hereby incorporated by reference.

According to a first aspect thereof, the invention relates to a security document circuitry comprising an antenna, a rectifier and an EC-display, wherein said antenna is arranged to receive electromagnetic (EM) radiation from an external source and to convert it into electric energy. Said rectifier is arranged to receive electric energy from said antenna and convert said energy to a rectified current. Said electrochromic display is arranged to receive rectified current from said rectifier, and to alter its electrochromic state in response to said rectified current in order to indicate the authenticity of e.g. a security document.

The use of an EC-display is advantageous as it can be given almost any or at least a large variety of two dimensional shape, is cheap to produce, normally environmentally friendly and possible to manufacture using conventional manufacturing processes such as printing techniques and e.g. roll to roll printing.

The different components can be deposited on the support by means of conventional printing techniques such as screen printing, intaglio printing, offset printing, ink-jet printing and flexographic printing, or coating techniques such a knife coating, doctor blade coating, extrusion coating and curtain coating, such as described in "Modern Coating and Drying Technology" (1992), eds E D Cohen and E B Gutoff, VCH Publishers Inc, New York, N.Y., USA. In those embodiments of the invention that utilise a conducting polymer as electron conducting material, this material can also be deposited through in situ polymerisation by methods such as electropolymerisation, UV-polymerisation, thermal polymerisation and chemical polymerisation. As an alternative to these additive techniques for patterning or forming the components, it is also possible to use subtractive techniques, such as local destruction of material through chemical or gas etching, by mechanical means such as scratching, scoring, scraping or milling, or by any other subtractive methods known in the art.

According to a second aspect thereof, the invention relates to a security document, which comprises a security document circuitry as described above. In other words, the security document circuitry is integrated in or on a security document, such that the authenticity of the security document can be verified by use of an electromagnetic field (EM-field). The EM-field activates the EC-display, such that the colour thereof changes. The EC-display is preferably arranged such that the change in colour can be visually detected when the security document is viewed in reflection and/or in transmission.

The security document circuitry can be provided on or in the security document via a number of means. The circuitry can e.g. be provided directly on the security document by means of printing or adhesion. Alternatively, the circuitry is first arranged on a carrier that is subsequently integrated into a security device. The security device is later integrated in or on the security document. This alternative will be described in more detail in relation to a fourth aspect of the invention.

According to one embodiment of the invention, the security document circuitry is integrated on or in a paper and/or plastic based security document substrate. Optionally, the display of the security document circuitry may be provided in an aperture of a security document.

According to one embodiment, a protective layer is provided, which covers the security document circuitry. Preferably, the protective layer is made of a material which is durable, and even more preferred the protective layer is made of a durable, transparent material, such as a plastic overlaminate or a printed varnish layer. The printing of a varnish is advantageous as it facilitates the application of the protective layer locally on the security document.

According to a third aspect thereof, the invention relates to a security device which is arranged to be integrated in a security document. The security device comprises a security device layer or a carrier whereon the security document circuitry is arranged. This is advantageous as it facilitates the integration of the circuitry in or on the security document, as the components of the circuitry are already arranged in electric contact with each other on the security device layer. Advantageously, the security device is self-contained, since this enables a facilitated integration of the security document circuitry in or on the security document.

According to one example the security device layer is made of a paper and/or plastic based material, the material is preferably selected from the group consisting of polyethylene terephthalate; polyethylene naphthalene dicarboxylate; polyethylene; polyvinylidene fluoride, polypropylene; paper; coated paper, e.g. coated with resins, polyethylene, or polypropylene; paper laminates; paperboard; corrugated board; glass and polycarbonate. These materials can also constitute the base for the security document substrate.

Advantageously, the security device is arranged such that it can be integrated or inserted in or on the security device using known techniques for insertions of foils, threads etc. The security device layer should preferably have suitable properties, such as a sufficiently high melting point and tear resistance in order to facilitate an integration of the security device using a conventional paper processing method.

According to one example, the circuitry is provided on a wide tape that is inserted in or applied to the security document substrate. Optionally, the tape or security device layer is arranged such that the EC-display is located in an aperture or window in the security document substrate. Suitable techniques are further described in EP059056, WO0039391 and WO9308327. According to another example the security device layer is a security thread, which is wholly or partially inserted in to the security document substrate. Alternatively, the security device layer is a foil patch or stripe which is applied on the surface of the security document substrate.

According to one embodiment, several security document circuits are arranged preferably sequentially on a continuous elongated security device layer, which substrate is optionally wound on e.g. a reel, such that for instance mass production of security documents comprising security document circuits are facilitated. According to a further embodiment, the security document circuits are arranged on the security device layer with such intervals, that at least two circuits may be integrated in or on the intended security document. This is advantageous as it increases the redundancy of the security arrangement. According to a yet further embodiment, the security document circuits are equally spaced along the security device layer. Alternatively, the security document circuits may be arranged at irregular intervals along the security device layer.

According to a fourth aspect thereof, the invention relates to a method of making a security device arranged as described above. The making of the security document preferably comprises the steps of:

providing a first and a second security device layers;

arranging an antenna of electrically conducting material on said first security device layer;

arranging a rectifier of electrically conducting material on either of said first and second security device layer;

arranging an electrochromic display on either of said first and second security device layers;

arranging electrical conductors of electrically conducting material on at least said first security device layer, and attaching said first security device layer to said second security device layer, such that said rectifier is electrically connected to both said antenna and said electrochromic display, at least after said first and second layers have been attached to each other.

According to one embodiment said antenna, rectifier, electrical conductors and/or electrochemical display are/is arranged on the security device layer by means of an additive method such as adhesion or printing. According to one embodiment said antenna, rectifier, electrical conductors and/or electrochemical display are/is arranged on the security device layer by means of a subtractive method such as etching or scraping. According to one embodiment at least one of said antenna, rectifier, electrical conductors and electrochemical display are arranged on the security device layer by means of a combination on additive and subtractive methods.

For example, one of said security document layers may be provided with at least one substantially continuous layer of electrically conductive material, whereof at least a portion of said antenna, rectifier, electrical conductors and/or electrochemical display are/is formed by removing portions of said continuous layer according to a predetermined pattern.

Optionally, a conductive layer comprised in one of said security device layers may be coated with an anti-corrosion layer, preferably in order to prevent deterioration of the conductive layer. Hence, an anti-oxidation layer may be applied on top of a conductive layer comprising e.g. Aluminium in order to prevent oxidation thereof.

According to one embodiment one or more of said antenna, rectifier, electrical conductors and/or electrochemical display are/is formed on said first security device layer, and the rest of the components are formed on said second security device layer. Thereafter, the two security device layers are attached to each other, such that the at least one component of the first security device layer is arranged in electric contact with at least one of the components arranged on the second security device layer.

Optionally, an adhesive layer may be provided on one of said security device layers. Thereafter, said first and second security device layers are attached to each other by being brought in contact with each other. The adhesion of the layers may be facilitated by pressure or heat being applied to said layers.

Alternatively, all components are formed on said first security device layer and are optionally covered by a protective layer, such as a laminate or varnish e.g. having the same properties as described in relation to said security document.

According to a fifth aspect thereof, the invention relates to a method of making security paper, wherein a security device as described above is incorporated into paper during a continuous papermaking process to produce paper from which a plurality of substantially identical pieces of paper can be obtained which, when printed, form substantially identical security documents, such as bank notes or certificates of authenticity.

Security Document Circuitry

In essence, the invention provides a security document circuitry which can be activated or interacted with using any useful source of EM-radiation which is able to emit a suitable EM-field, i.e. an EM-field which may be received and converted to sufficiently strong electric current in order to affect the EC-display, preferably within a desired time period. Thus, the verification of the security document does not require a specifically made verification unit. Rather a security document provided with said security device circuitry may for instance be verified using a suitable public or domestic source of EM-radiation, such as a sending DECT (Digital Enhanced Cordless Telecommunication) base station or even a running microwave oven; wherein the security document has been arranged. Further, a handheld device may be used as an EM-radiation source, and preferably a handheld wireless device, such as a mobile telephone or a PDA (Personal Digital Assistant). In this context, a handheld device is something which is designed to be operated when held in the hand of the user without the use of a separate support. In this context, a wireless device is a device which communicates by means of emitted radiation which is e.g. airborne. Further examples of EM-radiation sources includes leak fields, e.g. from mains devices. These normally emit a weaker EM-field compared to the devices described above, and consequently it will normally take longer until the display is altered when such a device is used.

The switch, alteration, or colour change of the display is typically a gradual process which is dependent on the voltage applied across the display, and more specifically on the rate of the electrochemical reaction of the display. In other words, the stronger the received EM-field the faster the display will switch or change colour. Hence, it is evident to the man skilled in the art that the antenna of the security document circuitry should preferably, but not necessarily, be adapted to the intended EM-radiation source in order to convert as much of the received EM-radiation as possible.

According to one embodiment of the invention the security document circuitry antenna or the energy harvesting antenna is arranged to receive a frequency band used by a mobile telephone communication system or a DECT telephone system or other EM-field communication system, e.g. a frequency band used by $2^{nd}$ or $3^{rd}$ generation mobile telephone communication systems. The antenna may for example be arranged to receive a frequency within the range of about 800 MHz to about 1,900 MHz. The antenna can also be designed for receiving EM-radiation at another frequency band, such as between about 40 to about 70 Hz, and preferably about 50 and/or about 60 Hz, i.e. the frequency which is normally used for mains devices. There are many other possible frequency ranges such as about 450 MHz (NMT), as well as the different frequency ranges used for CDMA, WLAN and WIFI and frequency ranges between about 1 and about 5 GHz, e.g. form about 2 GHz to about 3 GHz, preferably about 2.4 GHz or about 3.1 GHz.

Optionally, the EM-radiation source can be arranged within an activation unit, preferably having a flat upper surface and having a cord for connection to a wall socket for powering of the EM-radiation source. When the security document is to be authenticated it is placed in the vicinity of the activation unit, and preferably in contact with the flat surface of the activation unit. According to one specific example, an activation unit having a flat upper surface and comprising an antenna printed on a planar circuit board is used. The emitted frequency of the circuit board antenna is preferably optimised for the antenna arranged on the security document. Further, the surface area of activation unit preferably has about the same area as the security document and the activation unit is preferably less than 10 cm high, more preferred less than 5 cm high and most preferred less than 3 cm high. Moreover, the activation unit is preferably arranged to be placed on a table or the like.

For most antenna designs there is a predetermined frequency interval within which the energy transfer between the EM-source and the antenna is more efficient. However, normally energy can also be transferred at other frequencies although less efficiently. In other words, while using the same antenna frequencies between about 40 Hz and about 2000 Hz can be used for activation of the display.

In order for the EC-display to receive as much energy as possible, the antenna and the energy source are preferably held within a short distance from each other. In other words, when the antenna is designed for use with high frequency radiation sources, such as $2^{nd}$ or $3^{rd}$ generation mobile telephone frequencies, classical far field conditions will usually not apply to the antenna, as the antenna is held within the near field or the extreme near field of the antenna.

Advantageously, the security document circuitry is designed such that the display is only affected by a radiation source that is located near the security document, or within 10 cm or preferably within 5 cm or more preferably within 1 cm from the security document, such that the display is not unintentionally affected by background radiation or background noise.

According to one embodiment the antenna is arranged as a half-wave dipole antenna. Advantageously, this corresponds to a design which is straight-forward to manufacture. According to another embodiment, the antenna is arranged as a half-wave folded dipole antenna. This is advantageous as it facilitates the arrangement of the antenna in a more confined way. A dipole antenna can be folded in may different ways, as is known in the art. The antenna may for example be folded with straight angles, e.g. in a meander shape. According to one example the antenna is given a meander shape or the shape of a square wave, having either a constant or varying amplitude. Optionally, one or several of the antenna folds may be obtuse, acute or rounded. According to one example, the antenna is partially or wholly arranged such that it forms one or several words, preferably cursively written such that at least a large portion the antenna is formed of continuous material. The antenna can in other words be shaped as a signature, a logotype or any visually recognisable design, which preferably is made of a continuous piece of conducting material.

The inventors have realised that any rectifying means may be used which gives a net-contribution of rectified current within the frequency range of the EM-radiation source, and which current is sufficient to alter the EC-display within a desired time span, within 10 seconds and preferably within 5 seconds and more preferably within 1 second. As an example one or several organic or inorganic diodes may be used, such that e.g. half-wave or a full-wave rectification is achieved. According to one example a voltage doubler circuit is used as a rectifying means.

According to one embodiment the electrochromic device dynamic and has reverted to its initial state at least 10 seconds after the energy source was removed or turned off.

Advantageously the rectifier is thin, below 100 μm, preferably in the range 10-30 μm such that it can easily be integrated with a thin security document, such as a bank note. Provided that the received EM-radiation has a suitable frequency range, one or several printed organic semiconducting diodes may be used, which are formed e.g. as described in "50 MHz rectifier based on an organic diode" by Soeren Steudel et al, Nature Publishing Group 24, vol 4, August 2005. Alternatively, a chip type rectifier can be used which may be attached to the security document or the security device layer by adhesion.

According to one embodiment, said circuitry is arranged of thin layers, which are arranged substantially in a common plane. This is advantageous as it facilitates the arrangement of the security document circuitry in or on thin security documents, such as bank notes. Preferably, the rectifier is arranged in series with said antenna and said EC-display. According to one embodiment, at least a portion of the electric conductors which connects said rectifier to said EC-display and said antenna is formed of an organic material, and preferably of a printable organic material such as electrically conducting polymers. According to one example a first portion of the electric conductors are made of metal and second portion of the conductors are made of electrically conducting organic material, e.g. the electric conductors which connects the rectifier to the antenna is made of electrically conducting non-organic material, and the electric conductors which connects the rectifier to the EC-display are arranged of electrical conducting polymers. Alternatively, a portion of the electric conductors which connects the rectifier to the display is made of metal, and another portion is made of electrically conducting organic material.

According to one example one or more of the circuit components is/are printed.

According to one embodiment, the display is arranged on a reflective and/or non-transparent layer, in order to enhance the visibility of the display. According to one embodiment, the layer has a matt preferably white colour, alternatively the layer has a reflective surface. Advantageously, said layer is a portion of an electric conductor, preferably a metal conductor, connecting the display to the rectifier and the antenna.

According to one embodiment the EC-display comprises:

- at least one electrochromic element comprising (i) at least one material that is electrically conducting in at least one oxidation state and (ii) at least one electrochromic material, wherein said materials (i) and (ii) can be the same or different,
- a layer of a solidified electrolyte which is in ionic contact with said electrochromic element,
- at least one counter portion of electronically conducting material, spatially separated from said electrochromic element and in electrical contact with said electrolyte, and
- means for providing a voltage difference across said electrolyte.

By adjusting the voltage difference across said electrolyte, the electrochemical reaction which alters the colour of said electrochromic element may be controlled.

Preferably, said counter portion comprises electrochemically active material, such that upon application of a voltage difference between said electrochromic element and said counter portion a redox-reaction is initiated. Thus, said electrochromic material is oxidised and said counter portion is reduced, or vice versa.

In some embodiments the electrolyte is in the form of a continuous layer to which the counter layer and the electrochromic layer is connected, giving rise to a dynamic device in which establishment of said voltage difference results in a colour change that is reversed upon removing the voltage. In other embodiments of the present invention, an electrochromic display is provided in which three spatially separated portion of electrically conducting material are ionically connected to each other by a continuous electrolyte, wherein at least said middle portion is arranged of electrochromic material. The conduction of ions in this device is then interrupted, so that the application of voltage across the electrolyte results in reduction and oxidation reactions that are not reversed upon removing the voltage. Thus, bi-stable switching between states is made possible by these accumulator-like properties of such embodiments of the display.

In embodiments of the invention, an electrochromic display is provided, wherein the electrochromic display comprises at least one further electrochromic material or where the counter portion comprises electrochromic material to complement said electrochromic material in the electrochromic element. This makes it possible to realise displays with more than one colour, with for example one colour-generating oxidation reaction and one colour-generating reduction reaction taking place simultaneously at different locations in the display. As a further example, redox reactions giving rise to different colours at the same location, but at different applied voltages, can be designed. This further electrochromic material can be provided within the solidified electrolyte or within the electrochromic element, which then for example comprises an electrochromic redox pair.

In some preferred embodiments of the invention, the electric field(s) causing the colour changes in the electrochromic element are generated in a dynamic fashion, so that displays with animated or time separated effects can be realised. According to one embodiment this is achieved by the patterning of the electrochromic material, wherein preferably narrow, electrically non-conducting portions are arranged between two electrochromic portions. Optionally, electronically non-conducting portions are arranged between two electrochromic portions of said electrochromic element, such that an outer electrochromic portion is formed which at least partially embraces an inner electrochromic portion, with respect to said counter portion. The electrolyte is arranged such that it ionically connects said outer and inner electrochromic portions to said counter portion. Both said inner and outer electrochromic portions are advantageously applied to the same potential. When an appropriate voltage or potential difference is applied across said electrolyte, the outer electrochromic portion is reacted before said inner electrochromic portion. In other words, a time separated visual effect is achieved. In yet other words, a first part of the display is switched at a higher rate compared to another part of the display, which is arranged spatially separated from said first part of the display.

Optionally, more than one individually addressed counter portion can be used, and these can be positioned in a tailored manner so as to create animated elements in the display. Different and varying potentials can be applied to these elements, giving rise to variable electric fields in the electrolyte, by way of which animated effects can be controlled. These animated effects can be realised without the need for individually addressable pixels or segments. According to a further embodiment, a self controlled electric circuit comprising EC-displays is arranged such that the different displays elements, which are spatially separated from each other, are automatically switched in a time separated manner. In relation to this invention a "self controlled" electric circuit means that the electric circuit exhibits an animated or time separated effects without the need for any varying control potentials. In other words, when a sufficiently high potential difference is applied to the electric circuit one EC-display element is switched at a time, such that after a predetermined time period a first display element has switched to a greater extent than the other display element(s) of the circuit.

According to one example the electrochromic display comprises:

a first portion of electrochromic and electrochemically active material;

a second portion of electrochromic and electrochemically active material;

which first and second portions are electronically separated from each other;

a counter portion of electrochromic and electrochemically active material, which counter portion is electronically separated from both said first and second portions. Further, a layer of electrolyte ionically connects said counter portion with both said first and second portions; wherein said first portion is arranged spatially between said counter portion and said second portion on more than one side of said second portion, such that said first portion embraces said second portion.

The above arrangement is advantageous as it allows for a time separated switch of said first portion of electrochromic material, compared to the switch of said second portion of electrochromic material. In other words, initially and during the same time interval said first portion is switched to a greater extent compared to said second portion.

According to a second example, the electrochromic display comprises: a first pixel and a second pixel, each having an electrochromic layer and a counter layer electronically separated from each other, and a solidified electrolyte, which ionically connects said electrochromic layer and said counter layer. The counter layer of said first pixel and said second pixel is electronically connected to a first gate electrode and a second gate electrode, respectively, and the electrochromic layer of said first pixel electronically connects a first source electrode to a first drain electrode, whereas the electrochromic layer of said second pixel electronically connects a second source electrode to a second drain electrode. Further, each pixel comprises a switch portion of electrochemically active material arranged electronically between said source electrode and said drain electrode, which switch portion is in direct ionic contact with said solidified electrolyte. Additionally, resistance means is arranged between and electrically connected to a first contact portion and a second contact portion. Said first drain electrode is connected to said second gate electrode; and both said first drain electrode and second gate electrode is connected to said first contact portion of said resistance means. Moreover, said source and gate electrodes of said first pixel are arranged to receive and maintain a first potential difference; said source electrode of said second pixel and said second contact portion of said resistance means are arranged to receive and maintain a second potential difference.

In other words, the basic principle behind the above circuit is that said first and second pixels are arranged such that the electrochemical reaction of said first pixel effectuates an increase in the potential difference across the electrolyte of said second pixel, which increase causes an increased electrochemical reaction of said second pixel. Hence, in an initial state of said display said first pixel is electrochemically reacted at a higher rate compared to the rate at which said second pixel is electrochemically reacted. At a later stage, when the voltage difference across the electrolyte of said second pixel is sufficiently increased, the electrochemical reaction rate of said second pixel is significantly greater compared to in said initial state. Later still, said first and second pixels are fully reacted, the potential difference between said drain and source electrodes of said first and second pixel, respectively, are substantially equal and the pixels are normally reacted to a substantially equal amount.

The above basic principle can be provided by utilizing the principle of voltage division for achieving the desired raise in potential across the electrolyte of the second pixel, as the resistance between said drain and source electrodes of said first pixel increases.

Hence, according to one example said electrochemical material, said resistance means and said voltage differences are selected such that in an initial state of said first and second pixels the potential drop is lower between the source and drain electrodes of the pixel compared to across said resistance means, and such that the resistance of said switch portion increases upon a electrochemical reaction of said electrochemically active material.

The above embodiment is advantageous as it allows for a time separated switch of said first pixel and said second pixel. According to one example: in an inactive state of said first switch portion said first electrochromic layer is electrochemically reacted at a higher rate compared to said second electrochromic layer; and the electrochemical reaction changes the color and increases the resistance of said first switch portion, such that a flow of charge carriers between said second gate electrode and said second source electrode increases. When the increase in resistance is sufficiently high, the switch portion of said second pixel enters an active state, wherein said second electrochromic material is electrochemical reacted at a substantially higher rate, which electrochemical reaction changes the color of said second electrochromic material.

Definitions

Electrochemically active: an "electro-chemically active" element according to the present invention, is a piece of a material comprising an organic material having an electronic conductivity that can be electrochemically altered through changing of the redox state of said organic material. An electrochemically active element is normally in ionic contact with an electrolyte, and the electrochemically active element may furthermore be integrated with an electrode, being composed of the same or different materials.

Electrochromic element: an "electrochromic element" in relation to this invention is a continuous geometrical body, which can be patterned to different shapes, and is composed of one material or a combination of materials. The material(s) may be organic or inorganic, molecular or polymeric. Such an electrochromic element, whether it is composed of one material or is an ensemble of more than one material, combines the following properties: at least one material is electrically conducting in at least one oxidation state, and at least one material is electrochromic, i.e. exhibits colour change as a result of electrochemical redox reactions within the material. Optionally, the electrochromic element may comprise an electrochemically active material.

Electrochromic display: an "electrochromic display" is in relation to this invention a device comprising at least one electrochromic element, which device is arranged such that a colour change of the electrochromic element is visually detectable in reflection and/or in transmission.

Solidified electrolyte: for the purposes of the invention, "solidified electrolyte" means an electrolyte, which at the temperatures at which it is used is sufficiently rigid that particles/flakes in the bulk therein are substantially immobilised by the high viscosity/rigidity of the electrolyte and that it does not flow or leak. In the preferred case, such an electrolyte has the proper rheological properties to allow for the ready application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte preferably comprises an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

Electrodes: "electrodes" in devices according to the invention are structures that are composed of an electrically conducting material. Further, in the context of this invention the electrodes are normally not in direct contact with the electrolyte of the EC-display. Instead, the electrodes are connected to e.g. a counter portion or an electrochromic portion of the EC-display, which portions in turn are in direct contact with the electrolyte. By inducing a first potential in the electrode or wire closest to the counter portion, and a different potential in the electrode or wire closest to the electrochromic element, an electric field within the solidified electrolyte layer is created and preferably sustained for a time period long enough for the desired colour changes to occur.

Layer: according to one embodiment, a security document circuitry has a laminate structure and consists of "layers" of different materials. These layers can be continuous or patterned, and can be applied to each other (self-supporting device) or to a support (supported device). Furthermore, the term layer is intended to encompass all of the same material in the same plane, regardless whether this material is patterned or interrupted in such a way as to form discontinuous "islands" in the plane. The security document circuitry preferably has a planar configuration.

Direct electrical contact: Direct physical contact (common interface) between two phases (for example counter element and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example counter element and electrolyte or electrolyte and electrochromic element, or by occurrence of capacitive currents due to the charging of the Helmholtz layer at such an interface.

Dynamic display: in certain embodiments of the invention, a "dynamic display" is provided. The colour change in the electrochromic element(s) in such a display is reversed upon removal of the energy source. This can for instance be achieved by the arrangement of a capacitor in parallel with said electrochromic element.

Bi-stable display: in certain embodiments of the invention, a "bi-stable display" is provided. The effects of a colour change in the electrochromic element(s) in such a device remain after removal of the external voltage.

Colour change: when reference is made to "colour change", this is also meant to include changes in optical density or reflectance, so that "colour change" for example takes into account changes from blue to red, blue to colourless, colourless to blue, dark green to light green, grey to white or dark grey to light grey alike.

Materials

Preferably, the solidified electrolyte comprises a binder. It is preferred that this binder have gelling properties. The binder is preferably selected from the group consisting of gelatine, a gelatine derivative, polyacrylic acid, polymethacrylic acid, poly(vinylpyrrolidone), polysaccharides, polyacrylamides, polyurethanes, polypropylene oxides, polyethylene oxides, poly(styrene sulphonic acid) and poly(vinyl alcohol), and salts and copolymers thereof; and may optionally be cross-linked. The solidified electrolyte preferably further comprises an ionic salt, preferably magnesium sulphate if the binder employed is gelatine. The solidified electrolyte preferably further contains a hygroscopic salt such as magnesium chloride to maintain the water content therein.

In preferred embodiments, the electrochromic display comprises, as electrochromic material, an electrochromic polymer which is electrically conducting in at least one oxidation state, and optionally also comprises a polyanion compound. Electrochromic polymers for use in the electrochromic element of the electrochromic device of the invention are preferably selected from the group consisting of electrochromic polythiophenes, electrochromic polypyrroles, electrochromic polyanilines, electrochromic polyisothianaphthalenes, electrochromic polyphenylene vinylenes and copolymers thereof, such as described by J C Gustafsson et al in Solid State Ionics, 69, 145-152 (1994); Handbook of Oligo- and Polythiophenes, Ch 10.8, Ed D Fichou, Wiley-VCH, Weinhem (1999); by P Schottland et al in Macromolecules, 33, 7051-7061 (2000); Technology Map Conductive Polymers, SRI Consulting (1999); by M Onoda in Journal of the Electrochemical Society, 141, 338-341 (1994); by M Chandrasekar in Conducting Polymers, Fundamentals and Applications, a Practical Approach, Kluwer Academic Publishers, Boston (1999); and by A J Epstein et al in Macromol Chem, Macromol Symp, 51, 217-234 (1991). In a preferred embodiment, the electrochromic polymer is a polymer or copolymer of a 3,4-dialkoxythiophene, in which said two alkoxy groups may be the same or different or together represent an optionally substituted oxy-alkylene-oxy bridge. In the most preferred embodiment, the electrochromic polymer is a polymer or copolymer of a 3,4-dialkoxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly (styrene sulfonate). As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behaviour. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being both conducting and electrochromic; a piece of PEDOT-PSS with $Fe^{2+}/SCN^{-}$, PEDOT-PSS being conducting and electrochromic and $Fe^{2+}/SCN^{-}$ being an additional electrochromic component (see below); a piece composed of a continuous network of conducting ITO particles in an insulating polymeric matrix, in direct electrical contact with an electrochromic $WO_3$-coating; a piece composed of a continuous network of conducting ITO particles in an insulating polymeric matrix, in contact with an electrochromic component dissolved in an electrolyte.

As described above, an electrochromic display may comprise a further electrochromic material for realisation of displays with more than one colour. This further electrochromic material can be provided within the electrochromic element or the solidified electrolyte, which then for example comprises an electrochromic redox system, such as the redox pair of colourless $Fe^{2+}$ and $SCN^{-}$ ions on one hand, and of red $Fe^{3+}(SCN)(H_2O)_5$ complex on the other. By way of further, non-limiting example, such materials may be selected from different phenazines such as DMPA—5,10-dihydro-5,10-dimethylphenazine, DEPA—5,10-dihydro-5,10-diethylphenazine and DOPA—5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

FOILS: It is increasingly common to provide security documents with applied reflective security devices. Such devices are commonly referred to as foils and comprise plain metallic, coloured metallic, colour changing, holographic or diffractive effects. Such foils are typically applied by a hot foil transfer process. A description of an example hot transfer holographic foil construction can be found in U.S. Pat. No. 4,728,377. Though this description applies to a holographic foil all hot transfer foils have a similar basic construction. Namely they comprise a sacrificial polymer carrier layer, usually polyethylene terephthalate (PET) or polypropylene, which is provided with a release layer. Onto this release layer the foil device to be transferred is applied. This may be for example, one or more of at least, a single vacuum deposited reflection enhancing layer (metallic or high refractive index materials), or multiple vacuum deposited layers, or an embossed lacquer layer. Onto the layers to be transferred a hot melt adhesive is applied. The foil is then transferred by bringing the carrier construction into contact with a substrate such that the adhesive layer is in contact with the substrate surface and then applying heat and pressure. The heat and pressure activates the adhesive layer and bonds the foil to the substrate. The strength of the bond between the foil and the substrate is greater than that between the carrier and the foil due to the presence of the release layer, thus facilitating the removal of the carrier layer leaving only the very thin foil layers on the substrate.

The use of alternate foil constructions have been described in WO03054297 and EP723501. Here the foil is to be applied over a hole formed in the substrate during or after manufacture of the substrate. As the foil is to extend over a hole it is necessary to provide the foil construction with additional mechanical strength. To this end essentially the same foil construction is used as described above but no release layer is provided between the carrier and the foil. Thus once the foil is applied the carrier layer is not removed and remains in place permanently.

Though the above examples have been described in the context of using a hot melt adhesive it is also known to apply foils using pressure sensitive adhesives. Examples of such foil constructions can be found in EP1002640 and EP1323543. In both these examples a sacrificial carrier is used however it should be noted that the use of a pressure sensitive adhesive is also applicable where the carrier remains in place permanently.

THREADS: It is very well known to provide security papers with security threads either wholly or partially embedded. Modern security threads typically comprises a polymeric carrier onto which one or more additional layers of material are provided. Additional security layers include, for example, one or more of demetallisation patterns, diffraction structures, thin film interference structures, machine readable conductive or magnetic layers, liquid crystal materials, iridescent materials, thermochromic materials, photochromic materials or luminescent materials.

The security thread is inserted during the manufacture of the security paper. Several methods for the insertion of security threads have been developed. The most common method in use today is described in EP059056. This describes a method of manufacturing windowed thread paper. It is commonly understood within the security papermaking industry that windowed security papers are those comprising a thread which is alternately exposed and embedded on one side of the security paper.

EP059056 describes a method of manufacture of windowed thread paper on a cylinder mould paper-making machine. The technique involves embossing the cylinder mould cover and bringing an impermeable elongate security element into contact with the raised regions of an embossed mould cover, prior to the contact entry point into a vat of aqueous stock.

Where the impermeable security element makes intimate contact with the raised regions of the embossing, no fibre deposition can occur. After the paper is fully formed and couched from the cylinder mould cover, the contact points are present as exposed regions which ultimately form windows, visible in reflected light, on one side of a banknote paper.

Similarly a method for the manufacture of security papers containing windowed threads produced on a fourdrinier paper machine can be found in WO9308327.

More recently there has been a trend towards embedding wider security threads in paper. Within EP860298 there is described an anti-falsification paper which incorporates a wide impermeable security strip with a width between 2 mm and 4 mm. The paper is of multiply design, with at least two paper layers produced on separate paper machines. The security strip is embedded in a first ply and has perforations along the edges which permit water drainage and hence paper fibre deposition along the edges of the thread. The front of the strip is laid down over raised areas on the embossed cylinder mould cover before the raised areas enter the vat of paper stock so as to create windows of exposed strip in the contact regions. The width of the raised areas is narrower than the strip width to permit permeation through the perforations of the strip by paper fibres. However, the width of strip is so great that the paper formed on the back of the paper has flaws in the form of arbitrary holes in the region of the strip. A second ply of ordinary paper is independently formed and the two are laminated together and further processed, the second ply thereby covering the flaws in the back of the first ply and providing at least one homogenous paper surface. In another embodiment, a third ply is laminated over the front of the first ply to wholly embed the security strip. In yet another embodiment, the width of the strip is selected to be so wide that no paper forms on the back of the first paper ply to provide a continuous exposed area on the back. The front of the strip is laid on a continuous raised area on the mould cover before the raised areas enter the vat of paper stock to provide a continuous exposed area on the front. A second ply of paper is then laminated to the first ply to form the finished security paper and give a homogenous paper layer on one side and a continuous exposed strip on the other.

APERTURES: Even more recent developments in the manufacture of security paper now allow for the insertion of a very wide tape during the paper making process, this is described in WO00039391. During the insertion process it is possible to form fully transparent windows or, as they are known in the in the security paper industry, apertures. WO00039391 describes a method of making single ply paper which can have a wide elongate security thread at least partially embedded therein. This is achieved by blinding (i.e. sealing with a water impermeable material) one or more selected areas of a porous support surface, depositing a first layer of paper fibres onto the porous support surface around the blinded areas, bringing an impermeable elongate security thread to lie in contact with the blinded areas of the support surface such that at least the edges of the elongate security thread overlie the deposited layer, and depositing a further layer of paper fibres over the first layer and the impermeable strip to securely embed the edges of the elongate security thread within the paper. The blinded areas are impermeable, which substantially prevents the deposition of fibres thereon before the elongate security thread is laid thereover. Thus, substantially no paper fibres are deposited on one side of the elongate security thread in a central region between edges of the elongate security thread to thereby expose a continuous area of the elongate security thread at a first surface of the paper. Additionally a plurality of discrete translucent or transparent windows (apertures) are formed in a second surface of the paper in which the elongate security thread is exposed.

Security Document

In relation to this invention the term security document comprises, banknotes, travellers cheques, bonds, share certificates, ID cards, ATM cards, passports, security passes, tickets, certificates of authenticity, security labels and brand protection articles such as labels, hang tags, swing tags, tear tapes or secure packaging for the purpose of protecting pharmaceutical good, high value luxury goods, fast moving consumer goods, sportswear, fashion garments and the like. The list is not exhaustive. A specific example is ePassports, which contain an IC chip wherein personal information such as name, nationality, date of birth and biometric information can be stored. The security document may serve as an additional security feature in addition to the IC chip in the ePassport.

The security document substrate may be made of any suitable material, such paper or plastic or combinations thereof, the security document is preferably made of a flexible material. According to one embodiment the surface of a paper based security document substrate is provided with a surface coat, such that the roughness of the paper is reduced and/or the durability of the paper is enhanced. This technique is well known for photographic papers, decorative papers and the like.

Traditionally, banknotes are produced on a paper based substrate. Banknote paper substrates are usually manufactured using cotton fiber, but other textile or wood fibers may be used as well as a combination of these. Australia was the first country in the world to fully convert to plastic bank notes. As of May 15, 1996, all denominations of Australian currency in circulation were plastic. According to one example these substrates comprises a 75 μm BOPP core (biaxially oriented polypropylene core) onto which two coats of matt white ink are printed on each side. The matt ink is printed selectively, so as to leave areas of the core uncoated to form transparent windows. This coated substrate can then be printed in the same manner as paper substrates.

The materials described above in relation to banknotes are equally applicable to any security document. Advantageously, the thickness of the security document substrate is adapted to the intended application. The security document substrate is preferably provided with a suitable coating, and e.g. a plastic substrate may optionally be provided with an ink receptive coating to improve adhesion of ink and/or the security device circuitry and/or a security device layer.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. Other objectives, features and advantages of the present invention will appear from the following detailed disclosure, from the attached dependent claims as well as from the drawings. Preferred embodiments will now be described, by way of example only, with reference to the accompanying drawings.

BRIEF DESCRIPTION OF THE DRAWINGS

FIG. 1*a* is a top view which schematically illustrates an emitter of EM-radiation and a security document circuit according to one embodiment of the invention.

FIG. 1*a*' is a top view of a security document circuit according to an embodiment the invention.

FIGS. 2*a*-2*f* illustrate different antenna configurations, which are suitable for use in a security document circuitry as described in relation to FIG. 1*a*.

FIG. 3*c*' is a schematic side view of the display shown in FIG. 3*c*.

DETAILED DESCRIPTION OF THE INVENTION

Figure 2E:
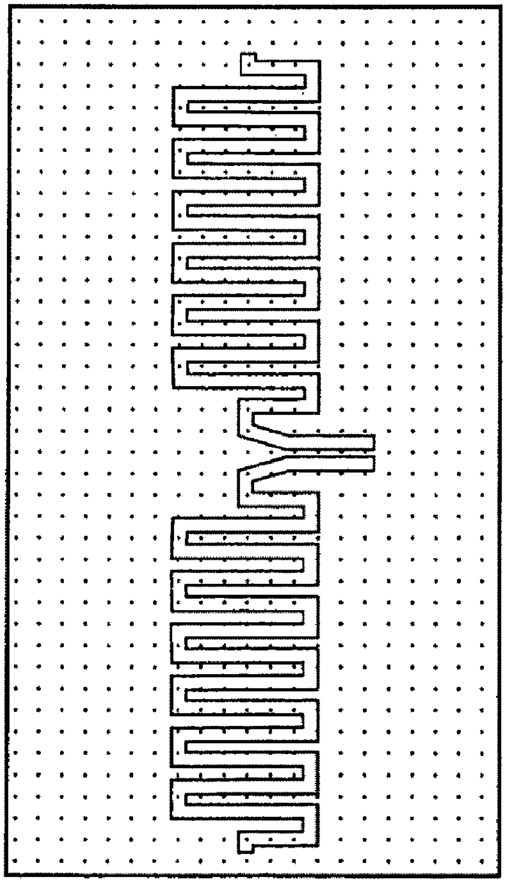

FIG. 1*a* is a schematic top view illustrating an emitter of electromagnetic radiation 190, and a security document circuitry 100 according to one embodiment of the invention, the circuitry 100 is enclosed by a dashed line. The circuitry 100 is arranged to receive and convert at least a portion of the emitted electromagnetic radiation for activating an electrochromic display 130 comprised in said circuitry 100. The security document circuitry additionally comprises an antenna or energy harvesting device 110 and a rectifier 120. The three components 110,120,130 are electrically connected in series such that the rectifier is coupled to and arranged in series between the antenna 110 and the electrochromic display 130; and the electrochromic display 130 is coupled to and arranged in series between the antenna 110 and the rectifier 120. The antenna 110 is arranged to convert received electromagnetic radiation into electric current; the rectifier 120 is arranged to receive said electric current and to convert it into a rectified current; and the electrochromic display is arranged to receive said rectified current and to change its colour in response thereto. Although the rectifier 120 is illustrated as a diode, any rectifying means can be used which provides a sufficient net contribution as described above. For instance, a suitable diode bridge or voltage doubler circuit may be used.

FIG. 1*a*' is a photo of an security document circuit 100' as described in relation to FIG. 1A, having a planar configuration, wherein an electrochromic display 130' and a diode 120' is arranged inside a coil antenna 110'. A coil antenna normally has the advantage of providing more energy to the circuit compared to a half wave dipole antenna.

FIGS. 2*a*-*d*' schematically illustrate different antenna arrangements. The point of connection to the rectifier and the display, respectively, is indicated by two dots 211, 212 in the respective FIGS. 2*a*-2*d*'. As described above the length of the antenna is preferably, but not necessarily, arranged such that the antenna 210*a* is a half wave dipole. With reference to FIG. 2*a*, the antenna consists of two straight lines of conducting material e.g. copper. According to an alternative embodiment, FIG. 2*b*, the antenna 210*b* corresponds to a half wave folded dipole antenna. According to yet an alternative embodiment, FIG. 2*c*, the antenna 210*c* corresponds to a folded dipole antenna having a meander folding with varying amplitude. Optionally, the meander antenna may have a constant amplitude. According to yet another alternative embodiment, FIGS. 2*d* and 2*d*', the antenna has a continuous but not regular shape and illustrates for example cursively written word(s). Alternatively, the antenna may be arranged as a coil antenna, as schematically illustrated in FIG. 1*a*'. In essence, the antenna can be given any shape as long as it is capable of harvesting enough energy to make the display change colour within a desired time limit.

Figure 2F:
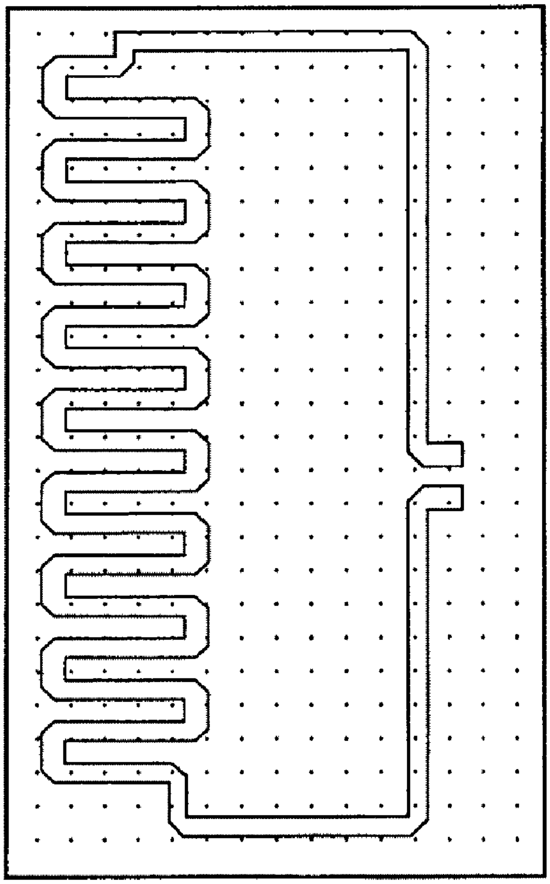

FIGS. 2*e* and 2*f* represents two antenna arrangements which are drawn to scale, and wherein the shortest distance between two dots corresponds to 1 mm. The antennas can be used over a wide frequency range, but is specifically suitable for a far-field situation at a frequency of about 900 MHz. FIGS. 2*e* and 2*f* illustrate a dipole antenna and a folded dipole antenna, respectively.

Figure 3A:
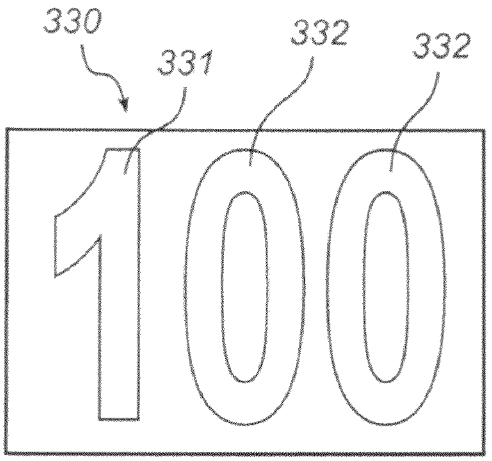
FIGS. 3*a*-3*c* are top views which schematically illustrates different arrangements of electrochromic displays for use in a security document circuitry as described in relation to FIGS. 1*a* and 1*a'*.

FIG. 3*a* illustrates one embodiment of the display, wherein the display shows a value e.g. 100. The display may be arranged to display any desired word, symbols, graphics etc. The display comprises electrochromic material and electrolyte which is sandwiched between electrodes (not shown), wherein at least one of the electrodes is transparent. The different areas 331,332,333 of the display can be arranged to be switched simultaneously or in a time separated manner. In the latter case, one portion of the display switches first, before another portion is switched to the same extent. The time separation can be achieved by a suitably arranged electric circuit, as described above, or by use of different materials having different response times.

Figure 3B:
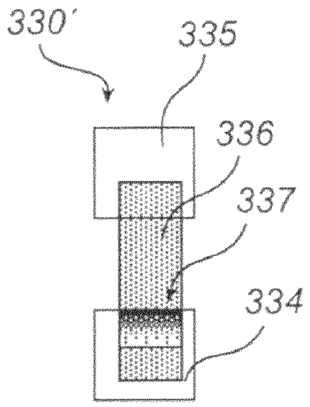

FIG. 3*b* illustrates a basic element of an electrochemically active, electrochromic display 330'. The element comprises an electrochromic portion 334 of electrochemically active and electrochromic material, a counter portion 335 of preferably electrochemically active material and a solidified electrolyte 336, which is arranged between, partially covers and ionically connects said counter portion 334 and said electrochromic portion 335. The surface of said electrochromic portion, which is covered by electrolyte 336, corresponds at least substantially to the area in which a change of colour is desired. The colour change is not strictly confined to the area which is covered by the electrolyte, but may propagate somewhat into the uncovered area. The electrochemical reaction, and hence the colour change, normally starts at the edge closest to the counter portion 337. Optionally, the electrolyte may cover a larger area compared to the area of desired colour change, provided that the electrochemical reaction is interrupted before the colour change has spread undesirably far. Preferably, the electrolyte covers a sufficiently large area of the counter portion 335, such that enough material can be reacted to balance, by a transport of ions in the electrolyte, the reaction of the electrochromic portion. In operation, when a sufficient voltage difference is applied across said electrolyte 336 e.g. by applying a first voltage to said electrochromic portion 334 and a second voltage to said counter portion, an oxidation or reduction of said electrochromic portion is effected. Optionally, a corresponding electrochemical reaction occurs at said counter portion 335. In other word, if said electrochromic portion 334 is oxidised, said counter portion 335 is preferably reduced, and vice versa. Optionally, the material to which said electrochromic portion is ionically connected by said electrolyte, e.g. the counter portion, is not electrochemically active.

Figure 3C:
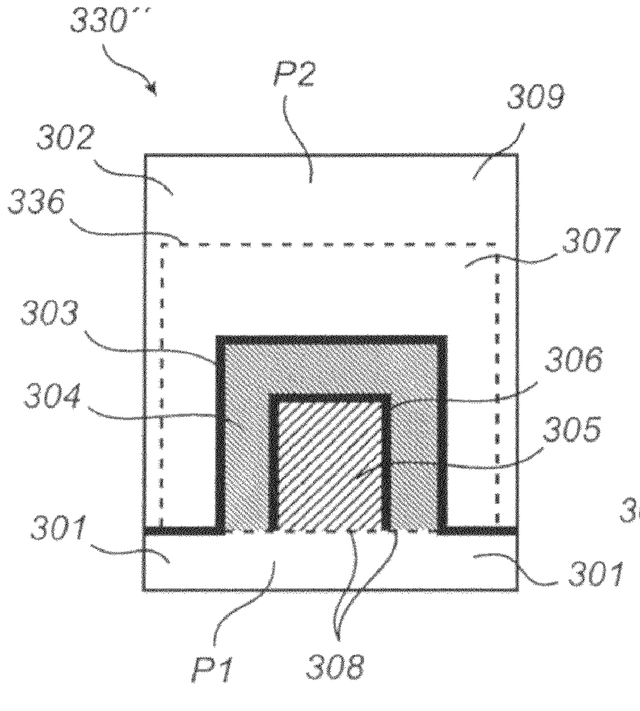
Figure 3C:
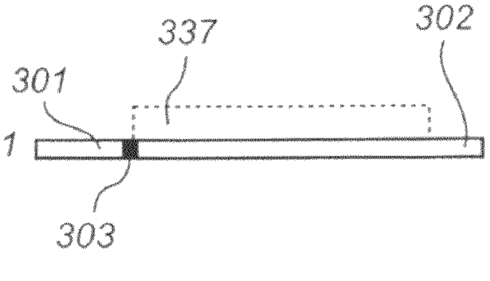

FIG. 3*c* is a top view which schematically illustrates an alternative embodiment of an electrochemically active, electrochromic display, based on the principles described in relation to FIG. 3*b*. According to this embodiment a first and second portion of electrochromic and electrochemically active material 301, 302 is provided. Said first and second portions are electronically separated from each other by first isolation means 303. An electrolyte 336 is provided which ionically connects said first and second portions 301,302. The area covered by electrolyte is indicated by a dashed line. The area of said first portion 301 which is covered by said electrolyte 336, as shown in FIG. 3*c*', is referred to as the active portion. This active portion comprises a first active element 304, which is electronically separated from a second active element 305 by second isolation means 306. Moreover, the area of said second portion 302 which is covered by said electrolyte is referred to as the counter portion 307. Said first and second active portions 304, 305 are each connected to a respective electrode, which may be one continuous electrode 308. The counter portion is also connected to a respective electrode 309. Said electrodes 308, 309 may be a respective portion of said first and second portions of electrochromic and electrochemically active material 301, 302.

A first potential P1 is applied to said first electrode 308, a second potential P2 is applied to said second electrode 309, and the potential difference is sufficiently high in order to effect a colour change of said first active portion. Due to said second isolation means 304 and the resulting distribution of the potentials in the electrolyte, the first and second active portions will switch in a well separated manner with respect to time.

If said first and second active elements 304,305 are not connected to one continuous electrode, but to two electronically separated electrodes; the potential difference between said counter portion and any of said first and second active portions should be substantially greater, compared to the potential difference between said first and second active element 304, 305.

Advantageously, said second isolation means 306 is arranged between said first and a said second active element 304,305, such that said first active element embraces said second active element with respect to said counter portion 307; as illustrated in FIG. 3*c*.

According to one embodiment said first and second active element 304, 305, said electrodes 308, 309 and said counter portion 307 are all formed by providing two over-oxidized lines 303, 306 in a preferably continuous sheet of electrochemically active, electrochromic and electrically conductive material, such as PEDOT-PSS.

Said first and second active element 304, 305 may be given any desired shape, such as e.g. an arrow or a star, instead of the illustrated squares of FIG. 3*c*. Independent of which shapes that are used, said first active element should preferably embrace said second active element, if a distinct time separated switching of said first and second element is desired. During a time separated switching, said first active element 304 is electrochemically reacted at a higher rate compared to said second active element 305.

FIG. 3*c*' is a schematic side view of the electrochromic display described in relation to FIG. 3C. FIG. 3C' illustrates that the electrolyte 337 is applied on top of said electrochromic and electrochemically active material.

Preferably, the isolation means 303, 306 are electronically none conductive or at least substantially none conductive.

Figure 4A:
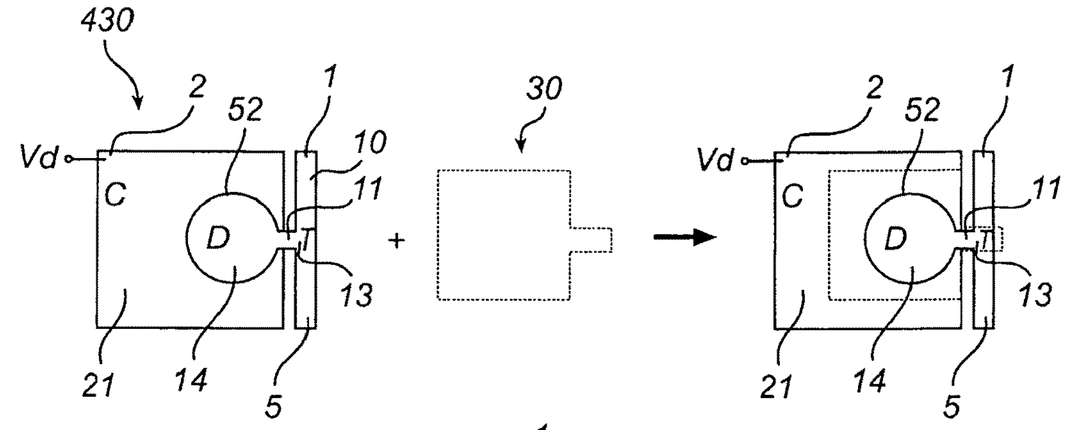
FIG. 4*a* is a top view which schematically illustrate another embodiment of an electrochromic display.

FIG. 4*a* illustrates one embodiment of a pixel according to the present invention. The pixel comprises an electrochromic layer 10 which is electronically connected to a source electrode 1, and a drain electrode 5. Which of the electrodes that is source electrode and drain electrode, respectively, is strictly speaking determined by the applied potentials. Said electrochromic layer also comprises a control portion or switch portion 13 spatially and electronically arranged between said source and drain electrodes 1,5. The control portion is arranged such that when it electrochemically reacted its electronically conductivity is either increased or decreased. Hence, a current between said electrodes 1,5 can be controlled by electrochemically reacting the control portion 13. Thus, the control portion need not be electrochromic, as long as its electronic conductivity can be electrochemically altered. According to one embodiment said electrochromic layer has an elongated shape which extends between said source drain electrodes 1,5. A counter layer 21 is arranged adjacent to and electronically separated from said electrochromic layer, and a solidified electrolyte 30 is arranged such that it ionically connects said counter layer 21 to said electrochromic layer 10 and the switch portion 13 thereof. Said electrolyte layer preferably covers said electrochromic layer 10, and is in direct physical contact therewith. Moreover, said counter layer is electronically connected to a gate electrode 2. The electrodes 1,2,5 may be arranged of any conducting material.

Said electrochromic layer further comprises an active portion 14. The active portion can have any 2D-shape, but preferably has the shape of a symbol such as a dot, disc or a star, which active portion 14 is arranged between said switch portion 13 and said counter layer. Said counter layer 21 preferably embraces or partially surrounds said active portion 14, such that a homogenous color change of said active portion 14 may be achieved. Optionally, said active portion 14 is electronically connected to said control portion by a bridging portion 11. In other words, said first portion 10 may comprise an active portion 14, a control portion 13 and a bridging portion 11, which bridging portion electronically connects said control portion 13 to said active portion 14.

According to one embodiment, the electrolyte 30 is arranged such that it ionically connects said first portion and second portions 14,21, and covers said active, bridging and control portions 14,11,13. When a suitable potential is applied across said electrolyte 30, by e.g. effecting a first potential at said gate electrode 2, and a second potential at said source electrode 5, an electrochemical reaction is initiated which changes the color and increases the resistance of said active portion 14. The electrochemical reaction is normally initiated in the part of said first portion 14, which is closest to said second portion. Thus, a front of the electrochemical reaction starting at the isolation means 52 spreads towards the bridging portion 11. In other words, the active portion 14 preferably has a geometrical shape which corresponds to the symbol which is to be displayed, e.g. a disc or a star. The geometrical shape is preferably defined by said isolation means 52. By extending the length of the bridging portion, the time until the control portion switches will be increased, and vice versa. Thus, it is not necessary that the bridging portion is electrochromic, just that the front of the electrochemically reaction is allowed to propagate therein.

The switch of this display is normally not referred to as being time separated, as the active, bridging and control portion 14,11,13 are electronically connected to each other by elements which are covered by electrolyte.

According to one example the electrochromic display 430 is preferably manufactured by providing one continuous material layer which is electrochromic, electronically conducting and electrochemically active, which material forms a preferably rectangular main portion, an elongated wiring portion, and a bridging portion 11, which connects said main portion to said wiring portion. The wiring portion forms said control portion 13 as well as said source and drain electrodes 1,5. An over-oxidized continuous uncrossed line 52 may be arranged in said main portion, starting and ending at said bridging portion, such that it divides said main portion in said active portion 14 and said second portion 21, i.e. in two electronically separated portions. Thereafter an electrolyte is provided which covers at least said active portion 14, said bridging portion 11, said control portion 13, and preferably an equally large area of said second portion 21.

Figure 4B:
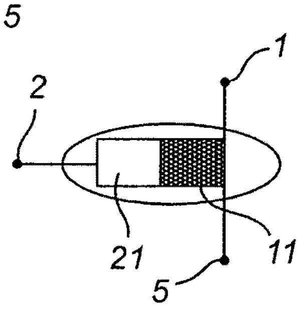
FIG. 4*b* is a symbol, which denotes the display described in relation to FIG. 4*a*.

FIG. 4*b* corresponds to a proposed symbol for use in circuitry diagrams, corresponding to the right most device illustrated in FIG. 4*a*.

Figure 4C:
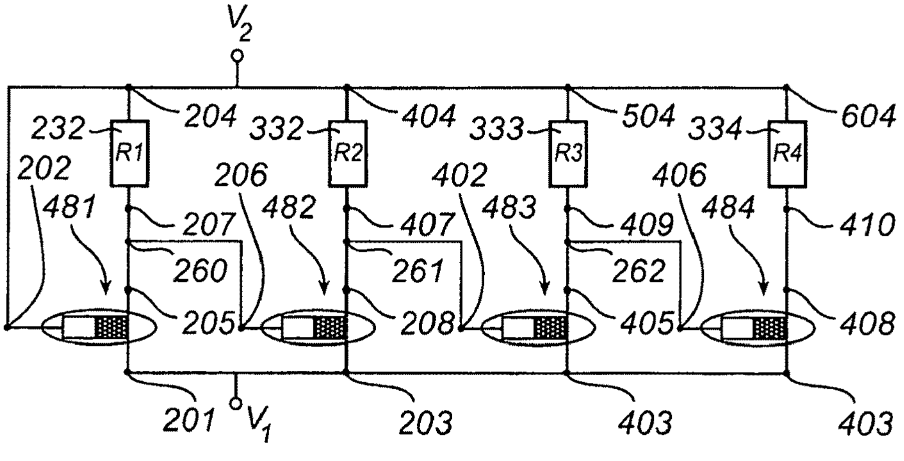
FIG. 4*c* is a circuit diagram, describing an arrangement whereby four separated display element, each arranged as described in relation to FIG. 4*a*, is switched in a time separated manner.

FIG. 4*c* schematically illustrates a circuit diagram wherein four pixels are updated or switched in a time separated and sequential manner, such that the color of a first pixel 481 is substantially altered before the color of a second pixel 482, the color of which is substantially altered before the color of a third pixel 483, the color of which is substantially altered before the color of a fourth pixel 484 is altered in the same way. According to one embodiment, each of the pixels are arranged as described in relation to FIG. 4*a*.

The drain electrode 205 of said first pixel 281 and the gate electrode 206 of said second pixel 282 are connected to a first contact portion 207 of a first resistance means 232, such that a first interface 260 is provided. Said first resistance means 232 is arranged between a first contact portion 207 and a second contact portion or a second electrode 204.

A drain electrode 208 of said second pixel 282, and a first contact portion 407 of a second resistance means R2 are both electronically connected to a gate electrode 402 of said third pixel, such that a second interface is provided 261. Further, a drain electrode 405 of said third pixel 283, and a first contact portion 409 of a third resistance means 333 are both electronically connected to a gate electrode 406 of said fourth pixel, such that a third interface is provided 262.

Four respective first potentials, are applied to a respective source electrode 201;203;401;403 of said pixels 481,482, 483,484. Four respective second potentials are applied to a respective second contact portion 204;404;504;604 of said resistance means 232;332;333;334. Further, a third potential is applied to the gate electrode 202 of said first pixel 281.

Said potentials and said resistance means are preferably arranged such that in an initial state the potential drop is smaller between said first interface 260 and said first electrode 201, compared to the potential drop between said first interface 260 and said third electrode 203. Further, the potential drop between said first and second electrodes 201, 202 is preferably lower compared to the potential drop between said third and fourth electrodes 203,204. The other pixels are arranged in a corresponding manner. Hence, initially the electrochromic material 10 of said first pixel 281 is electrochemically reacted to a larger extent and at a higher rate, compared to the electrochromic material of respective second, third and fourth pixel 482, 483, 484. The electrochemical reaction changes or alters the color and increases the resistance of the switch portion 11 of said first pixel 482. Due to this increased resistance the potential at said first common interface 260 will increase, and more charge carrier will flow between said first common interface 260 and the electrochromic layer of said second pixel 482. Eventually, this will increase the resistance between said source and drain electrodes of said second pixel 482, such that a switching or color alteration of said third pixel will be effectuated. Later yet, the resistance between said source and drain electrodes of said third pixel 483 is increased sufficiently due to yet another electrochemical reaction, such that a switching or color alteration of said fourth pixel will occur.

According to an alternative embodiment all or some of said resistance means R1-R4 are substantially equal in resistance, some or all of said source electrodes 201,203,401,403 are connected to a first common potential V1, and/or some or all of said second contact portions 204, 404, 504, 604 are connected to a second common potential V2. The gate electrode 202 of said first pixel 481 is preferably connected to said second common potential V2.

Suitable potential differences and resistance values of the resistance means are determined by the materials used for said pixels. In other words, below parameter values are given for one specific configuration of the display. These values shall be regarded as non-limiting examples with respect to the scope of the claims, and the skilled man would, in view of the description the examples given, have no difficulties in choosing other suitable parameter values for the display elements. According to a one example said electrochemically active material is PEDOT:PSS. Said layer of solidified electrolyte comprises an organic polymer in combination with a conductivity enhancing component i.e. a salt as well as surfactant, wetting and film forming agents, and the electrolyte is arranged on top and in physical contact with said sheet of electrochemically active material. Further, the value of the respective resistance R1-R4 is about 150 kOhm, and in the unreacted state the resistance between the gate and source electrodes of each pixel is about 1 MOhm and the resistance between the drain and source electrodes of each pixel is about 3 kOhm. In other words, if the potential difference is approximately 5 V, the potential at 260 is initially about 0.1 V. At a fully switched state the resistance between said source and drain electrodes (R-channel) is 680 kOhm, when the applied potential (V2−V1) is 5 V. Further, the potential at the interface 260 (P−260) is 4.1 V. The resistance of R1-R4 remain substantially the same.

The resistance between the source and drain electrodes at a fully switched state is dependent on the applied potential difference (V2−V1) in the following manner for the specific example described above:

| V2-V1 | P-260 | R-channel (fully switched) |
|---|---|---|
| 5 V | 4.1 V | 680 kOhm |
| 4 V | 3.1 V | 515 kOhm |
| 3 V | 2.1 V | 350 kOhm |
| 2 V | 1.1 V | 180 kOhm |

Normally, a potential difference of 0.5 V is needed in order to effectuate the electrochemical reaction.

Figure 4D:
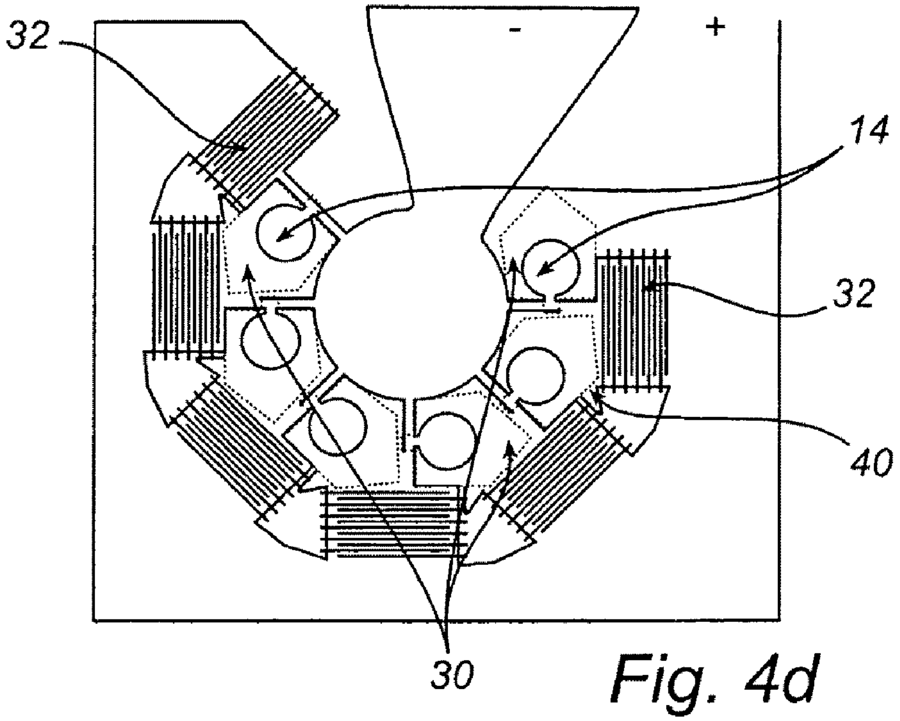
FIG. 4*d* is a schematic top view of one practical embodiment which implements the principles described in relation to FIG. 4*c*.

FIG. 4*d* is a top view which schematically illustrates a practical example of how several display elements of the type described in relation to FIG. 4*a* can be electrically connected to each other, as described in relation to FIG. 4*c*, that such a time separated switching is provided. This example comprises six display element, wherein the two additional display elements and two resistance means are arranged as continuations or repetitions of a portion of the circuitry shown in FIG. 4C. The resistance means, the electrochromic layers and the counter layers are defined by lines cut by a knife in a continuous layer of electronically conducting and electrochemically active material. These cuts are indicated by lines in FIG. 4D. Note that the outline of applied portions of electrolyte is indicated as dashed polygonals. Six resistance means are arranged as meanders defined by said straight lines. The first and sixth meander are indicated by a respective arrow 32. A first and sixth active portion are indicated by a respective arrow 14. A first, fourth and sixth electrolyte are indicated by a respective arrow 30. Each electrolyte covers a respective active portion, bridging portion and control portion, as well as a portion of the surrounding counter layer, in a respective display element.

A negative potential is applied to a portion of said continuous electrochromic layer which is an extension of the source portion or source electrodes of said pixels. A positive potential is applied to a portion of said continuous layer which is and extension of with said counter portions or said gate electrodes. The potential difference between said negative and positive voltage is, according to one embodiment, about 5 V. While the voltage is applied, one pixel switches at a time with a time difference of about 1 second, provided that the voltage is high enough.

As the voltage is removed, all the pixels switch back to their initial color, due to a reversed electrochemical reaction. If the voltage is turned on again, the pixels will again switch in a time separated manner.

The above described displays are only examples which can readily be amended and combined to provide a desired function or appearance of the display.

Figure 5A:
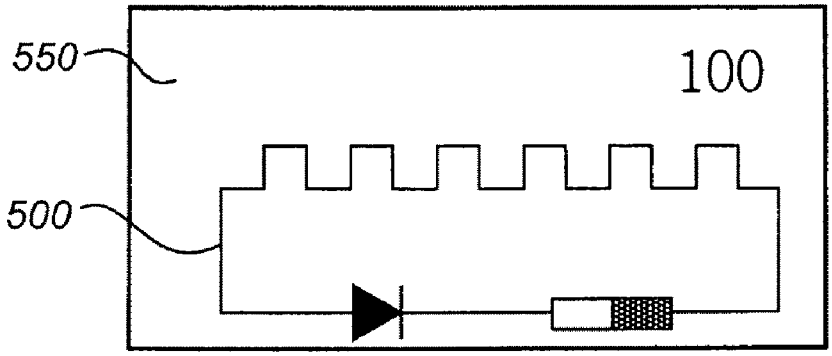
FIGS. 5*a* and 5*b* are schematic top views of a security document provided with security document circuitry, and a security device, respectively.

FIG. 5*a* illustrates a security device circuitry 500 arranged as described in relation to FIG. 1*a*, which is provided on a security document substrate 550. The circuitry can be arranged anywhere on the substrate by means of e.g. printing and/or adhesive techniques. According to one embodiment the circuitry occupies a major portion of the security document substrate, according to an alternative embodiment the circuitry occupies less than half, preferably less than a quarter, and more preferred less than 10% of the security document substrate. As stated above, the security document substrate can be a top layer or an intermediate layer in a security document, which layer is visible or hidden by e.g. an additional layer. According to one embodiment the security document is fully completed before the circuitry is applied in or on the security document. Independent of its arrangement in or on the security document, the electrochromic display is preferably always visible to the human eye in one of its states, i.e. either when it is activated or when it is de-activated. Thus, the display may be arranged such that its colour fades in response to a received EM-field. Consequently, in a case where the electrochromic display is not visible to the human eye in its un-activated state, e.g. because it is covered by a not sufficiently transparent layer and/or because the display itself is transparent and/or because the contrast difference between the display and the surrounding area is not sufficient, the display is preferably visible to the human eye in its active state at least in back lighting or transmission, e.g. as a darker area compared to colour of the area surrounding the display.

Figure 5B:
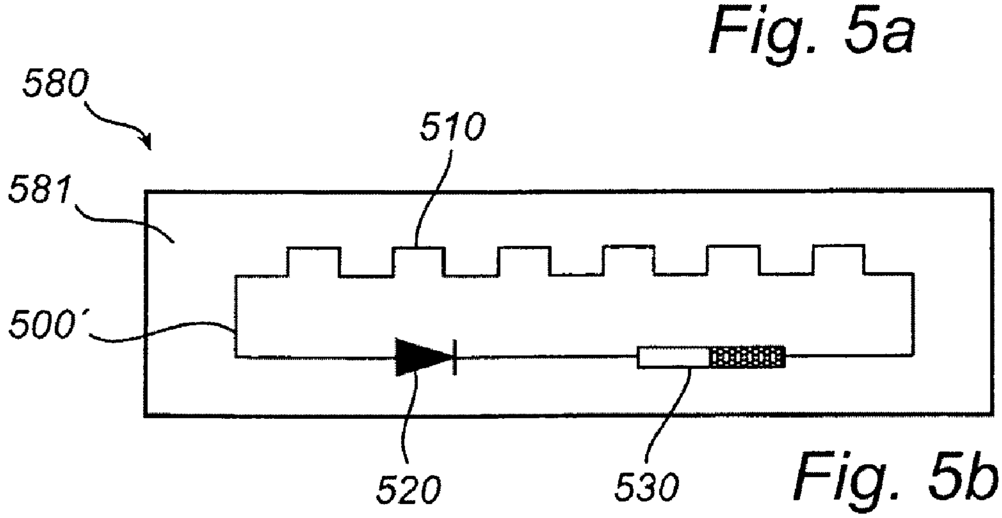

Alternatively, the security document circuitry may be arranged on a carrier, which is later integrated in or on a security document. FIG. 5*b* is a schematic illustration of a security device 580 comprising a security document circuitry 500', which is arranged on a carrier 581. According to this embodiment, an antenna 510, a rectifier 520 and an electrochromic display 530 is arranged on a first layer 581 of the security device. The circuitry and the display may be arranged according to any of the embodiments described above.

Optionally, the circuitries described in relation to FIGS. 5*a* and 5*b* may have a planar configuration and may be covered by a protective layer.

Moreover, several security device circuitries may be arranged on the same security document, either by being attached directly on the security document substrate as described in relation to FIG. 5*a* or by first being provided on a security device layer as described in relation to FIG. 4*b*, which security device is later integrated in a security document.

Additionally, with reference to both the electrochromic display which is arranged directly on a security document substrate as described in relation to FIG. 5*a*, and the electrochromic display which is first arranged on a carrier as described in relation to FIG. 5*b*, the electrochromic display may be arranged in a window or aperture of said security document. According to one embodiment several circuits are arranged on the same security document, and only one display is visible in a window of the security document.

Figure 6A:
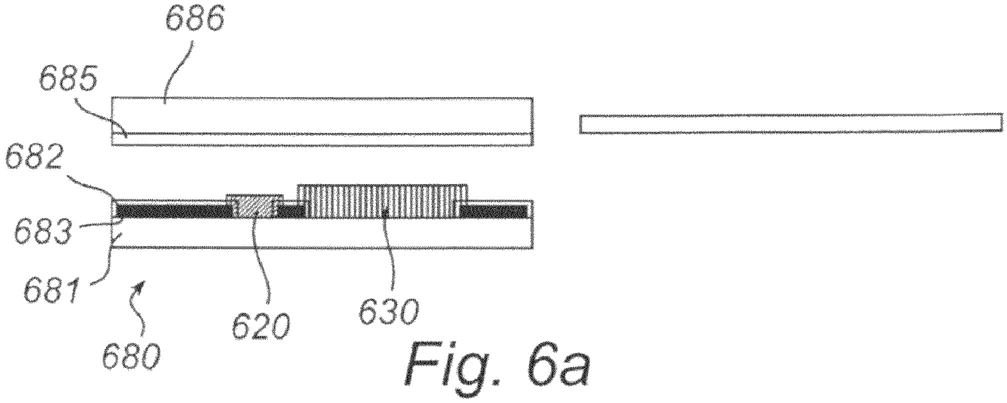
FIGS. 6*a* and 6*b* are schematic side views of different ways to manufacture the security device.

According to one method of producing the inventive security device a carrier or a first security document layer is provided, whereon a security device circuit arranged as described in relation to FIG. 1 is provided. FIG. 6*a* schematically illustrates a side view of this arrangement. According to this embodiment a first security document layer 681 is arranged of a polypropylene layer having a thickness of between 15-25 μm, and which is coated with a layer of aluminium foil 683 having a thickness of between 5-10 μm. The antenna and the conductors of the security device circuitry is formed by removing appropriate portions of the aluminium foil 683. Optionally, the aluminium layer is coated with a anti-corrosion protective layer 682 preferably having a thickness of between 1-5 μm. Additionally, a rectifier 620 is attached to the security document layer 681 and the subtractivly formed aluminium conductors, in electrical contact with the antenna. Thereafter an electrochromid display 630 is provided on the first security document layer 681 by printing at least one segment of electrochromic material, such that one or two of the segments is/are in electric contact with at least two portion of said aluminium conductors. Optionally, the security document circuit 680, is covered with an additional layer of polypropylene 686 having a thickness between 15-20 μm; or a protection layer, such as an over-varnish layer 684 having a thickness of between 3-10 μm. The additional polypropylene layer 686 is preferably provided with an adhesive coating 685, having a thickness of 1-5 μm, in order to facilitate the attachment of the polypropylene layer to said first security document layer and/or the components thereon.

Figure 6B:
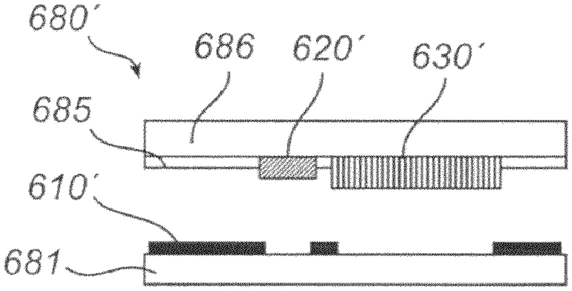

FIG. 6*b* schematically illustrates a side view according to another embodiment of the manufacturing method. The difference between this method and the method described in relation to FIG. 6*a*, is that the rectifier 620' and the electrochromic display 630' are arranged on a second security device layer 686. The second security device layer is preferably a plastic or paper based substrate, e.g. a polypropylene substrate having a thickness of between 15-25 μm, preferably about 20 μm. The rectifier and display may be provided on the second layer by an additive method. Optionally, said second layer may further be provided with an adhesive layer 685 having a thickness between 1-5 μm, in order to facilitate attachment to said first layer and/or the components thereon. Thereafter, the first and second security device layers are attached to each other, by means of known techniques, in such a way that electrical contact is provided between said rectifier 620' and the antenna 610', between the electrochromic display 630' and the rectifier 620', and between the antenna 610' and said electrochromic display 630'. Alternatively, said first and second security device layer 681, 686 each comprises a portion of a component, e.g. the rectifier, which portions are arranged such that the desired rectifying capability is formed once the two layers are attached to each other.

Figure 7:
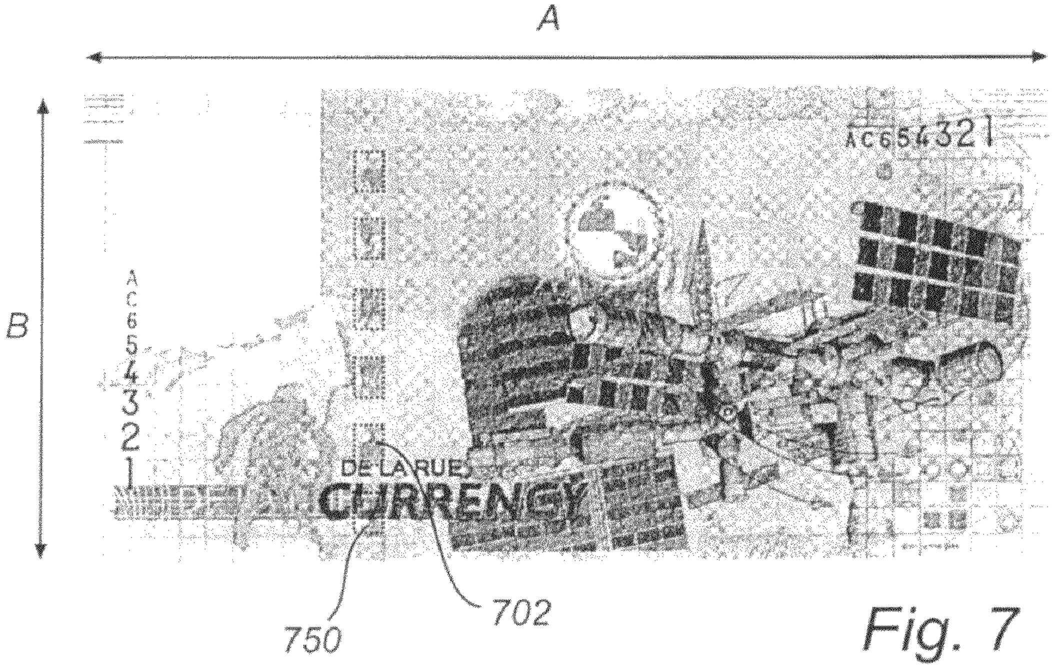
FIG. 7 is a schematic top view of a security document circuitry which is integrated in a security document such that it is displayed apertures thereof.

FIG. 7 illustrate one way of arranging a security device, manufactured e.g. as described in relation to FIG. 6*a*, in a security document 750. The security device is integrated as an intermediate layer in the security document during a continuous paper making process, such that the device extends along the machine direction "B" of the security document. "A" indicates the cross direction of the document. Portions of the security device are visible through windows 702 comprised in the document. The electrochromic display is arranged as described in relation to FIG. 4*c*. According to this embodiment there are six display elements arranged in a row, one in each window or aperture 702 of the security document. Once an energy source, such as an sending antenna of a mobile telephone is brought in the vicinity of the security document, e.g. at a distance of 1-6 cm from the antenna of the security device, the EM-field of the antenna is sufficient to switch the display elements e.g. in a time separated manner. Alternatively, all displays can be switched without intermediate delay.

Preferably, the insertion of the security device is registered at least in the machine direction such that a centering of the electrochromic display element in a window or aperture of the security document is facilitated.

The invention has mainly been described above with reference to a number of explicitly disclosed embodiments. However, as is readily appreciated by a person skilled in the art, embodiments other than the ones disclosed above are equally possible within the scope of the invention, as defined by the appended patent claims.

The invention claimed is:

1. A security document, circuitry comprising:

an antenna arranged to receive EM-radiation from an external source and to convert it into electric energy;

a rectifier arranged to receive electric energy from said antenna and convert said energy to a rectified current; and an electrochromic display arranged to receive rectified current from said rectifier, and to alter its electrochromic state in response to said rectified current in order to indicate the authenticity of a security document, wherein the electrochromic display comprises:

a first pixel and a second pixel, each having an electrochromic layer and a counter layer electronically separated from each other, and a solidified electrolyte, which ionically connects said electrochromic layer and said counter layer of said first and second pixel, respectively, wherein the counter layer of said first pixel and said second pixel are electronically connected to a first gate electrode and a second gate electrode, respectively;

the electrochromic layer of said first pixel electronically connects a first source electrode to a first drain electrode, the electrochromic layer of said second pixel electronically connects a second source electrode to a second drain electrode;

each pixel comprises a switch portion of electrochemically active material arranged electronically between said source electrode and said drain electrode, which switch portion is in direct ionic contact with said solidified electrolyte;

and a resistor being arranged between and electrically connected to a first contact portion and a second contact portion;

said first drain electrode being connected to said second gate electrode; and both said first drain electrode and second gate electrode being connected to said first contact portion of said resistor, wherein said source and gate electrodes of said first pixel are arranged to receive and maintain a first potential difference; and said source electrode of said second pixel and said second contact portion of said resistor are arranged to receive and maintain a second potential difference; such that the voltage difference across the electrolyte of said second pixel is controllable by an increase in resistance between said source and drain electrodes of said first pixel.

2. A circuitry according to claim 1, which is arranged to receive and rectify EM-radiation having a frequency corresponding to that used by a wireless communication system, more preferably to that used by a mobile telephone communication system, even more preferably to that used by a $2^{nd}$ or $3^{rd}$ generation mobile telephone communication system.

3. A circuitry according to claim 1, wherein said antenna is a dipole antenna, and more preferred a half-wave dipole antenna.

4. A circuitry according to claim 1, wherein said electrochromic display comprises:

a first and a second electrochemically active element, which are electronically separated from each other, an electrolyte which is arranged in ionic contact with at least a portion of both said first and said second electrochemically active element.

5. A circuitry according to claim 4, wherein at least one of said electrochemically active element is arranged to alter its redox-state in response to said rectified current.

6. A circuitry according to claim 4, wherein said first and second electrochemically active element is arranged in a common plane.

7. A circuitry according to claim 1, wherein the rectifier is arranged to rectify an alternating current having a frequency of between 1 and 5 GHz.

8. A security document comprising a circuitry according to claim 1.

9. A security document according to claim 8, wherein said security document is a banknote, passport, identity document, travellers cheque, bond, share certificate, security pass, ticket, fiscal stamp or certificate of authenticity.

10. A security device comprising a circuitry according to claim 1 carried by a first security device layer, which security device is arranged to be integrated with a security document.

11. A security device according to claim 10, which is between 4 to 100 mm wide, and preferably between 6 to 30 mm wide.

12. A security device according to claim 10, which is between 30 to 150 mm long, preferably shorter than 100 mm, and more preferably longer than 60 mm.

13. A security device according to claim 10, wherein the thickness of the security device layer is between 5 to 40 μm, and preferably 15 to 25 μm.

14. A security device according to claim 10, wherein the thickness of the security device is less than 100 μm, preferably less than 70 μm, more preferably less than 60 μm, even more preferred less than 50 μm, and even more preferred less than 40 μm and most preferred less than 30 μm.

15. A tape for integration in security documents during a continuous paper making process comprising a continuous sequential arrangement of security devices, each device arranged as described in claim 10.

16. A method according to claim 15, wherein said security device is integrated into paper during a continuous papermaking process to produce paper from which a plurality of substantially identical pieces of paper can be obtained which, when printed, form substantially identical security documents, such as bank notes.

17. A method according to claim 15, wherein there is used a cylinder mould papermaking machine to produce paper having apertures or windows in each of which there is present a portion of the security document.

18. A method according to claim 15, wherein the security device is positioned continuously between two webs of paper which are laminated together to produce security paper.

19. A method according to claim 18, wherein said step of providing said first and second security document layers, further comprises providing at least one of said security device layers with at least one continuous layer of electrically conducting material, and at least one of the steps of arranging said antenna, arranging said rectifier, arranging said electrochromic display and arranging said electrical conductors comprises the step of removing portions of electrically conducting material from said at least one continuous layer, preferably by mechanical or electrochemical means.

20. A method according to claim 18, wherein said rectifier, said electrochromic display and said conductors are arranged on said first security device layer.

21. A method according to claim 18, wherein said rectifier and electrochromic display are arranged on said second security device layer.

22. A method according to claim 15, wherein the security device is integrated in or on a first ply of paper, which first ply of paper is later attached to a second ply of paper.

23. A method of producing a security device as defined in claim 10, comprising the steps of:

providing a first and a second security device layer;

arranging an antenna of electrically conducting material on said first security device layer;

arranging a rectifier of electrically conducting material on either of said first and second security device layer;

arranging an electrochromic display on either of said first and second security device layers;

arranging electrical conductors of electrically conducting material on at least said first security device layer, and attaching said first security device layer to said second security device layer, such that said rectifier is electrically connected to both said antenna and said electrochromic display, at least after said first and second layers have been attached to each other.

24. A security document circuitry comprising:

an antenna arranged to receive EM-radiation from an external source and to convert it into electric energy;

a rectifier arranged to receive electric energy from said antenna and convert said energy to a rectified current; and an electrochromic display arranged to receive rectified current from said rectifier, and to alter its electrochromic state in response to said rectified current in order to indicate the authenticity of a security document, wherein the electrochromic display comprises:

a first portion of electrochromic and electrochemically active material;

a second portion of electrochromic and electrochemically active material;

which first and second portions are electronically separated from each other;

a counter portion of electrochromic and electrochemically active material, which counter portion is electronically separated from both said first and second portions; and a layer of electrolyte which ionically connects said counter portion with both said first and second portions;

wherein said first portion is arranged spatially between said counter portion and said second portion on more than one side of said second portion.

* * * * *